United States Patent
Goodman et al.

[15] 3,704,788
[45] Dec. 5, 1972

[54] SEWAGE TREATMENT SYSTEM

[72] Inventors: Brian L. Goodman; Robert B. Higgins, both of Overland Park, Kans.

[73] Assignee: Ecodyne Corporation, Chicago, Ill.

[22] Filed: Jan. 11, 1971

[21] Appl. No.: 105,189

[52] U.S. Cl. ............................................210/401
[51] Int. Cl. .............................................B01d 33/14
[58] Field of Search ........210/54, 401; 162/336, 348, 162/358, DIG. 1

[56] References Cited

UNITED STATES PATENTS

| | | | |
|---|---|---|---|
| 3,399,111 | 8/1968 | Beaumont et al. | 162/358 X |
| 2,895,614 | 7/1959 | Komline | 210/401 |
| 2,916,145 | 12/1959 | Kaiser | 210/401 |
| 2,568,420 | 9/1951 | Thomson | 210/401 |
| 2,435,467 | 2/1948 | Spencer | 162/DIG. 1 |
| 2,907,388 | 10/1959 | Seaman | 162/336 |
| 3,492,200 | 1/1970 | McKie et al. | 162/358 X |
| 3,109,219 | 11/1963 | DeBell et al. | 162/DIG. 1 |

*Primary Examiner*—Reuben Friedman
*Assistant Examiner*—T. A. Granger
*Attorney*—Hume, Clement, Hume & Lee, Ltd.

[57] ABSTRACT

A concentrator system having a large diameter vacuum drum over which an endless filter media screen is trained. The endless screen has an overall length substantially greater than the circumference of the drum and is trained over an idle roller horizontally displaced from the drum. Solid containing liquid slurry or sludge is flowed onto the generally horizontal upper reach of the screen adjacent the roller by horizontal feed. As the screen carries the slurry or sludge away from the feed end, gravity filtering of liquid through the screen takes place. When the screen passes over the drum, vacuum de-watering further reduces the liquid content.

6 Claims, 5 Drawing Figures

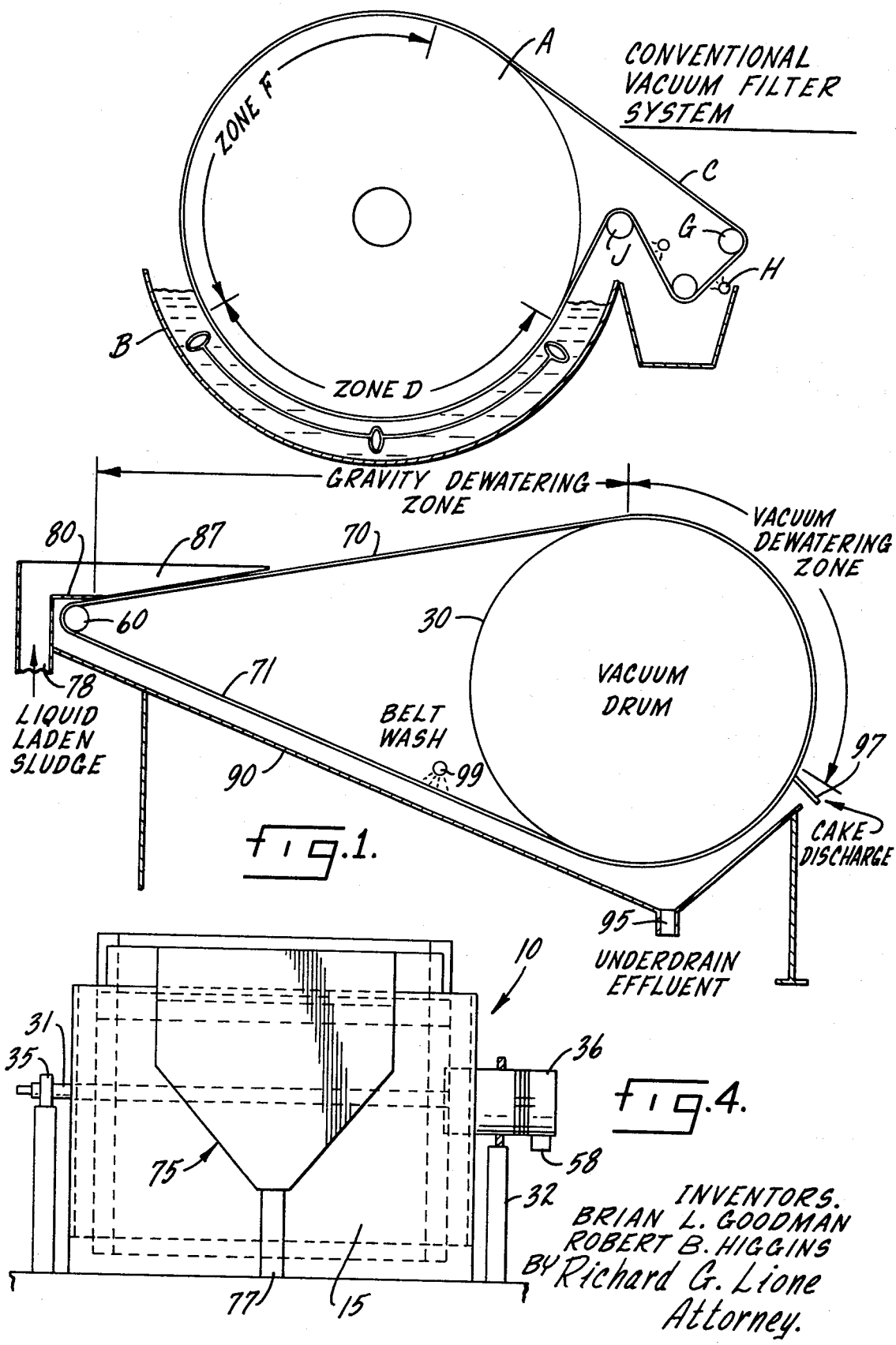

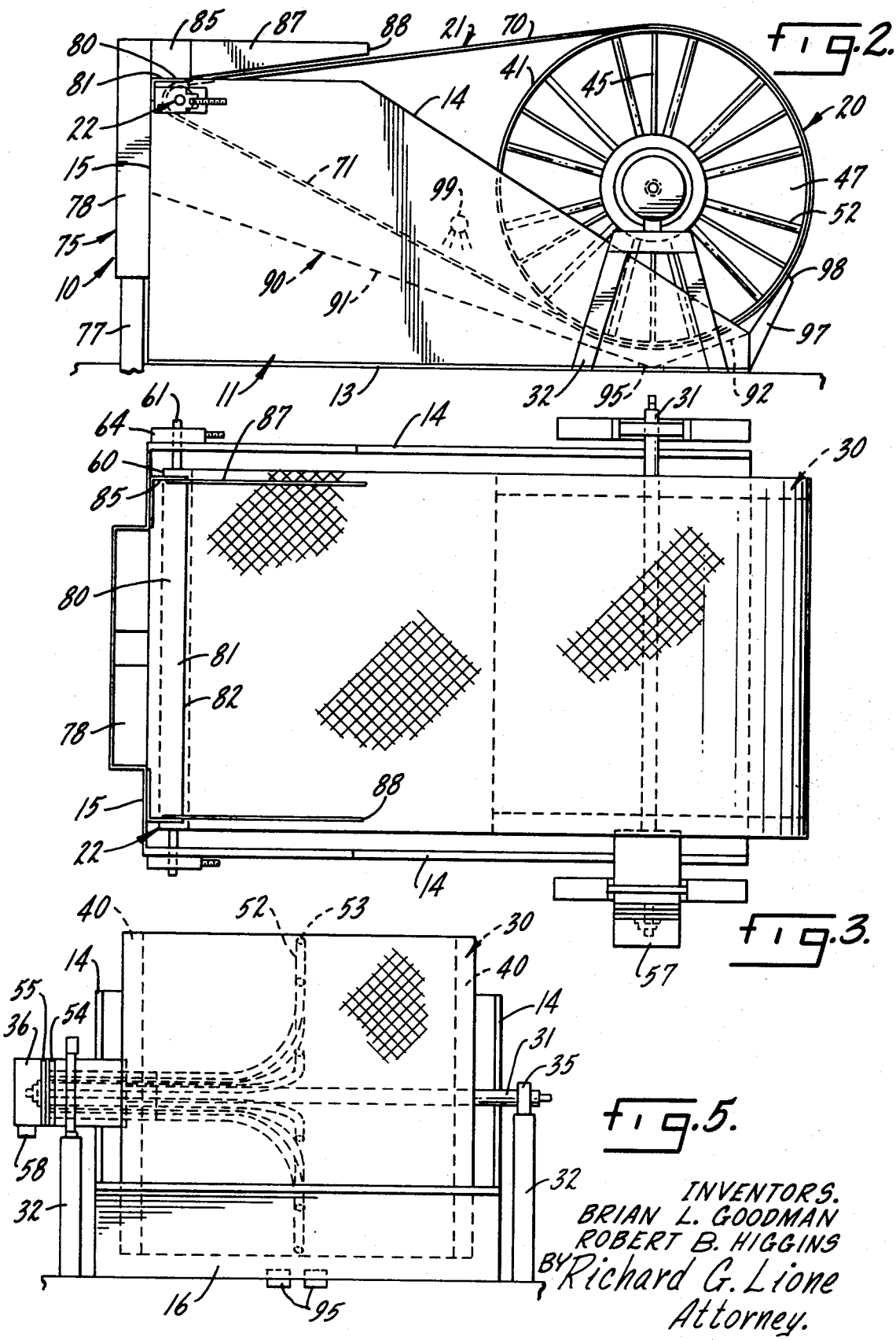

SEWAGE TREATMENT SYSTEM

BACKGROUND OF THE INVENTION

This invention relates in general to the treatment of solid containing liquids and more particularly with the concentration of solids from a liquid. It deals specifically with the concentration, for disposal, of sludges which are the product of sewage aeration, sedimentation or chemical precipitation or the like.

A wide variety of sludge concentration systems, as they will herein be referred to, are presently available in the United States. Some of these systems rely primarily on the force of gravity to draw liquid from the sludge through a filter media and concentrate or de-water the sludge, while others employ a vacuum drum over which a filter media is passed and into which the liquid filtrate is drawn through the media. There are, in addition, a few systems extant which employ both gravity and a vacuum arrangement to draw liquid from a sludge through a filter media to de-water or concentrate it.

Exemplary of the most effective gravity-type system is that illustrated in the applicant's own Goodman et al. U.S. Pat. No. 3,531,404, issued Sept. 29, 1970, titled SEWAGE TREATMENT SYSTEM. This system employs an endless filter media screen extending in generally horizontal relationship between rollers. Liquid filtrate drains downwardly through the screen from the high liquid content sludge deposited on it as the screen moves horizontally.

The vacuum drum sludge treatment concept is best understood by reference to the drawings where a simplified cross-sectional view of a "conventional vacuum filter system" is shown. This drum type vacuum filter system consists of a cylindrical drum A which rotates partially submerged in a sludge tank B. A filter media screen C covers the filter drum and retains the solids from the sludge while passing liquid into the drum as the filter media moves through the sludge cake pick-up zone D. As a section of the drum A rotates into the zone D, appropriate valving within the drum A creates a pick-up vacuum in that section of the drum and liquid flows from the sludge through the filter media into the drum where it is disposed of through suitable piping. The solid portion of the sludge retained on the filter media C as it departs the feed tank B and enters the drying zone F, where much of the remaining free water is removed. The filter media screen C then passes a discharge roll G where the sludge cake is removed, after which the filter media is washed with spray water, as at H, before being returned to the filter drum over a return roller J.

In contrast to both of the aforedescribed systems, one system which employs both vacuum and gravity concepts in de-watering sludge is manufactured by Ametek, Inc./Process Equipment, East Moline, Illinois, under the trademark FILT-R-BELT. This is essentially a horizontal filter media screen arrangement, with the added feature of vacuum boxes disposed beneath the horizontal run of the filter screen. These horizontal vacuum boxes assist in drawing the liquid filtrate through the media from the liquid laden sludge deposited on the moving screen.

SUMMARY OF THE INVENTION

The present invention is embodied in an improved concentrator system for de-watering and concentrating the solids in a high liquid content slurry or sludge or the like. A primary object of the invention in its preferred form is to provide an improved concentrator system which advantageously employs both a vacuum and gravity in de-watering and concentrating sewage sludges to solid concentrations that will allow the sludge to be either burned or disposed of by burial in the case of a non-combustible sludge.

The foregoing and other objects are realized in accord with the invention by providing a concentrator system including a filter media comprising a fine mesh, mono-filament screen, having openings in the range of 50–500 microns, which is trained around a rotatable drum. The endless screen is longer than the circumference of the drum so that a section of substantial length extends generally horizontally toward the drum into tangential relationship at the top of the drum from a point spaced from the drum where it is trained over an idle roller. High liquid content slurry or sludge flows horizontally onto the screen through a distribution trough adjacent the aforementioned idle roller.

The screen is continuously moving away from the distribution trough so that clean screen is continuously being exposed to the incoming slurry or sludge. As the screen advances, gravity de-watering of the sludge takes place along the substantially horizontal screen section, prior to engaging the drum, in a gravity de-watering zone. The filtrate that drains from this zone is caught by a filter pan and disposed of through an effluent drain.

The screen carrying the partially de-watered solids rotates around the drum through a vacuum de-watering zone. The drum around which the filter media screen is trained is divided into a number of sections, each of which is connected to an automatic control valve by internal piping. The automatic control valve regulates the application of vacuum to the compartments of the drum and, as a section of the drum enters the vacuum de-watering zone, the valve applies vacuum to that section to draw additional liquid through the screen and effect further de-watering.

The water which is removed in this manner is discharged from the drum through piping in the drum. The cake of solids is removed from the screen as it passes out of the vacuum de-watering zone and then the screen is washed before returning to the distribution trough.

BRIEF DESCRIPTION OF THE DRAWINGS

The invention, including its construction and method of operation, taken with other objects and advantages thereof, is illustrated more or less diagrammatically in the drawings, in which:

FIG. 1 is a diagrammatic view of the sludge concentrator system embodying features of the present invention;

FIG. 2 is a side elevational view of a sewage treatment unit incorporating the system of the present invention;

FIG. 3 is a top plan view of the unit illustrated in FIG. 2;

FIG. 4 is a front elevational view of the unit, as seen from the distribution trough end; and FIG. 5 is a rear elevational view of the unit, as seen from the drum end, illustrating the vacuum pipe and valve system of the drum.

DESCRIPTION OF THE PREFERRED EMBODIMENT

Referring now to the drawings, and particularly to FIGS. 2-5, a sewage treatment unit incorporating a sludge concentration system embodying features of the present invention is illustrated generally at 10. The unit 10 includes a box-like body 11 including a floor 13, identical side walls 14, a front end wall 15, and a back end wall 16. The floor and walls are joined at adjacent edges in liquid tight seams and leave an open top.

The side walls 14 of the open top body 11 extend the full height of the front wall 15 for approximately one-third the length of the body, from which point they are inclined downwardly to terminate at the same height as the relatively short back wall 16. The result is a body 11 which has relatively high side walls adjacent its front end, sloping to relatively low side walls adjacent its back end. This configuration is designed to accommodate a vacuum drum assembly 20 inside the body and a filter screen 21 which extends from the drum assembly 20 to an idle roller assembly 22 adjacent the front wall 15 of the body 11.

The vacuum drum assembly 20 includes a drum 30 mounted for rotation about the horizontal axis of its center shaft 31 on drum support "horses" or stanchions 32. One end of the shaft 31 is journalled for rotation in a conventional bearing 35 affixed to the top of the stanchion 32 while the opposite end of the shaft 31 is journalled in an automatic distributor control valve 36 mounted atop the stanchion 32.

The drum 30 includes oppositely disposed circular drum ends 40 rigidly secured to the shaft 31. Extending between the drum ends 40 and forming the annular outer periphery of the drum is a cylindrical drum wall 41. The drum ends 40 are each fabricated of a relatively thin sheet metal in a well-known manner and braced by a plurality of radially extending partitions 45. They are impervious to the passage of liquid. On the other hand, the cylindrical outer wall 41 of the drum 30 contains a myriad of tiny perforations designed to facilitate the passage of liquid through the wall.

The drum 30 is separated into a plurality, six in the present illustration, of circumferentially spaced chambers 47 by radially extending partitions 45 disposed between the shaft and the inner surface of the cylindrical drum wall 41. These partitions extend the length of the drum 30, between the ends 40 and are, in the manner of the ends 40, impervious to the passage of fluids.

Each of the compartments 47 contains a generally L-shaped pipe 52 which extends from its open free end 53 adjacent the drum wall 41 through a corresponding end 40 of the drum 30 into the valve 36. In the valve 36, the pipes 52 open through corresponding ports in a rotatable valve plate 54. The valve plate 54 rotates in sealed relationship against a fixed valve plate 55 having a single aperture extending through it. The aperture in the fixed valve plate 55 is so arranged that it places the vacuum chamber 57 of the valve 36 in communication with two adjacent pipes 52 when the chambers 47 in which these pipes 52 are disposed pass through a vacuum de-watering zone, in a manner hereinafter discussed in detail. Suffice it to say for the moment that a vacuum maintained in the chamber 57 from a suitable vacuum producing source through an external pipe 58 is made effective in successive ones of the chamber 47 as the drum 30 rotates so that the vacuum is effective in a prescribed de-watering zone on the periphery of the drum to aid in de-watering the sludge being treated according to the invention.

The filter media screen 21 is trained around the cylindrical outer wall 41 of the drum 30 and the idle roller assembly 22, as has been pointed out. The screen 21 is endless and preferably made of a polyester fabric such as DuPont's Dacron. The fabric is, at any rate, of a mono-filament, mesh construction. In the form used herein, it has openings of a moderate size in the 50 - 500 micron range. It should be pointed out at this point that the term "mono-filament" as used in this application to describe the screen material, is also intended to be inclusive of woven materials wherein the strands which are woven to form the mesh are, in their own right, actually formed of multiple fibers or the like. Thus, "mono-filament" in the glossary of this application means "single strand."

The idle roller assembly 22 comprises a conventional, smaller diameter idler roller 60 affixed to a horizontally disposed shaft 61. The shaft 61 is journalled, at its ends, in horizontally adjustable journal blocks 64 mounted on the side walls 14 of the body 11.

With the filter media screen 21 trained over the roller 60 and the drum 30, the idler roller assembly 22 is adjusted by moving the journal blocks 64 to draw the screen taut in a generally horizontal, although slightly inclined upper run 70, and a lower run 71 which is inclined at a substantially greater angle to the horizontal. Both the upper run 70 and the lower run 71 of the screen 21 extend into tangential relationship with the drum 30. The screen 21 is constantly driven with the drum 30 and the roller 60 in a clockwise direction by a suitable power source and a drive shaft connection (not shown) to the drum shaft 31.

Mounted on the front end wall 15 of the unit body 11 is a sludge feed complex 75 which delivers liquid-laden sludge to the filter media screen 21 on its upper run 70 adjacent the idle roller 60. The feed complex 75 includes a sludge inlet pipe 77 connected to a suitable source of liquid laden sludge (not shown). The sludge inlet pipe 77 feeds upwardly into a relatively wide sludge well 78 which extends above the level of the end wall 15 and the side walls 14 of the unit body 11. Opening inwardly of the body 11 from the feed well 78 and its uppermost end is a sludge distribution trough 80. The floor 81 of the distribution trough 80 terminates at an inner edge 82 over the screen run 70 adjacent the innermost extremity of the roller 60, as seen in FIG. 4.

The side walls 85 of the trough 80 have baffles 87 extending therefrom on opposite sides of the screen run 70 toward the drum 30. As seen in FIGS. 3 and 4, these side baffles 87 terminate at their innermost ends 88 approximately mid-way in the screen run 70 to the drum 30 from the roller 60. The baffles are designed to prevent the high liquid content sludge feeding onto the screen run 70 adjacent the roller 60 from running off the sides of the run.

Underneath the drum 30, roller 60 and screen 21 trained therearound, is a filter pan 90. The pan 90 extends the length of the body 11, is supported from the floor 13 thereof, and includes a long downwardly inclined section 91 from the front wall 15 of the body to the floor 13 immediately under the drum 30 and a short upwardly inclined section 92 from this point underneath the drum 30 upwardly to the top of the short back wall 16. A pair of drain ports 95 are formed in the bottom of the filter pan 90.

Secured to the back wall 16 of the body 11 is a sludge scraper blade 97. The transversely extending working edge 98 of the blade 97 extends into immediately adjacent relationship with the screen 21 trained around the drum 30 and it is designed to scrape de-watered sludge from the drum.

Attention is now directed to FIG. 1 for a brief explanation of the operation of the unit 10 incorporating the sludge concentrator system embodying features of the invention. Here, in diagrammatic illustration, it will be seen that liquid-laden sludge is fed up through the sludge well 78 and out of the trough 80 onto the screen run 70. The sludge thus loads horizontally onto the screen run 70. The side baffles 87 contain it so that the high liquid content sludge stays on the screen run 70.

The screen moves away from the distribution trough 80 toward the drum 30 through a "gravity de-watering." Drainage of liquid from the sludge takes place by gravity in this zone and a sludge cake is formed. The liquid filtrate which drains from the gravity de-watering zone is caught in the filtrate pan 90 and exits through the ports 95.

When the partially de-watered sludge reaches the drum 30, it enters the "vacuum de-watering zone." The automatic valve 36 is effective, by virtue of the porting in the valve plates 55 and 54, to apply vacuum to adjacent compartments only during the portion of their rotation wherein they are passing through the vacuum de-watering zone. The sludge cake is further de-watered as it passes through this zone by vacuum applied to these sections. The water is removed from inside the drum through the pipes 52 which are drawing air out of the section to reduce the pressure and create the partial vacuum therein.

After the sludge cake rotates out of the vacuum de-watering zone, the vacuum is automatically released by the valve 36 and the sludge cake, by its own weight, tends to fall off the filter screen. To assure that all the sludge cake is removed, however, the scraper knife 97 scrapes any remnants of it off before the screen 21 passes back into the body 11 of the unit 10.

On its return trip to the roller 60, the filter media screen 21, in its run 71, is washed by a water spray unit 99 extending between the side walls 14 of the body 11. The spray water is also caught in the filtrate pan 90 and passes out through the effluent ports 95.

It will now be recognized that a sludge concentrator system has been described which obtains desirable, high solid content sludge which is characteristic of a vacuum-type system while eliminating the necessity of "lifting" solids and liquid out of a sludge tank with the vacuum system. As a result, the vacuum system can employ lower capacity piping, valving and auxiliary equipment, making system costs substantially lower. In addition, with the system of the present invention, the sludge cake does not tend to slough off the filter media screen as it moves on the drum, in contrast to the conventional system illustrated in FIG. 1, for example. Furthermore, the present system avoids classification of solids in the feed process; a common fault of conventional vacuum-type systems.

The invention has been discussed primarily in the context of a sewage sludge concentrator system. Its principles are, however, equally applicable to the concentration of other solids from a liquid carrier; various ores, sand, or organic particulates for example.

In this light, it will be noted that the system described has a slightly upwardly inclined upper screen run 70; described as generally horizontal. Where other materials are being treated, the incline might vary down to 0°, depending upon the characteristics of the solid content portion of the material.

While the embodiment described herein is at present considered to be preferred, it is understood that various modifications and improvements may be made therein.

What is desired to be claimed and secured by Letters Patent of the United States is:

1. A sludge concentrator system for solid material in a liquid carrier, comprising:
   a. drum means rotatable about a horizontal axis
   b. endless filter media screen means having a length substantially greater than the circumference of said drum means,
   c. said screen means being trained around said drum means and idle roller means horizontally displaced from said drum means so that a generally horizontal upper reach of said screen means is defined therebetween, wherein said upper reach of said screen means is inclined slightly upwardly in the direction of said drum means,
   d. baffle means bracketing said upper reach adjacent said idle roller means so as to contain said liquid laden sludge on said upper reach.
   e. means for feeding liquid laden sludge onto said upper reach adjacent said idle roller means,
   f. said drum means being rotatable in a direction to draw the screen means from said idle roller means toward said drum means,
   g. whereby gravity de-watering of the sludge through the upper reach of the screen means takes place as the screen means moves toward said drum, and
   h. said drum having vacuum means therein for drawing additional water from the partially de-watered sludge as it passes over said drum wherein said vacuum means includes valve means associated with said drum for causing a vacuum to be effective on the surface of the drum only in a fixed arcuate segment of the drum's rotational cycle and wherein said fixed arcuate segment includes a greater arc span of said drum than the first quadrant of said drum, measuring from the top of the drum in the direction of its rotation but less than the first and second quadrants together.

2. The sludge concentrator system of claim 1 further characterized by and including:
   a. sludge feed means adjacent said idle roller means adapted to feed liquid laden sludge horizontally onto said upper reach of said screen means.

3. The sludge concentrator system of claim 2 further characterized in that:

a. said sludge feed means including trough means overlying said idle roller means and adapted to direct liquid laden sludge onto said upper reach of said screen means in the direction of said drum means.

4. The sludge concentrator system of claim 1 further characterized in that:
   a. said drum has a relatively large circumference which is at least one-half of the length of the screen means.

5. The sludge concentrator system of claim 1 further characterized in that:
   a. said screen means is fabricated of a mono-filament, woven material in a single thickness.

6. The sludge concentrator system of claim 5 further characterized in that:
   a. said mono-filament screen means includes openings in the 50–500 microns size range.

* * * * *